Figure 4:
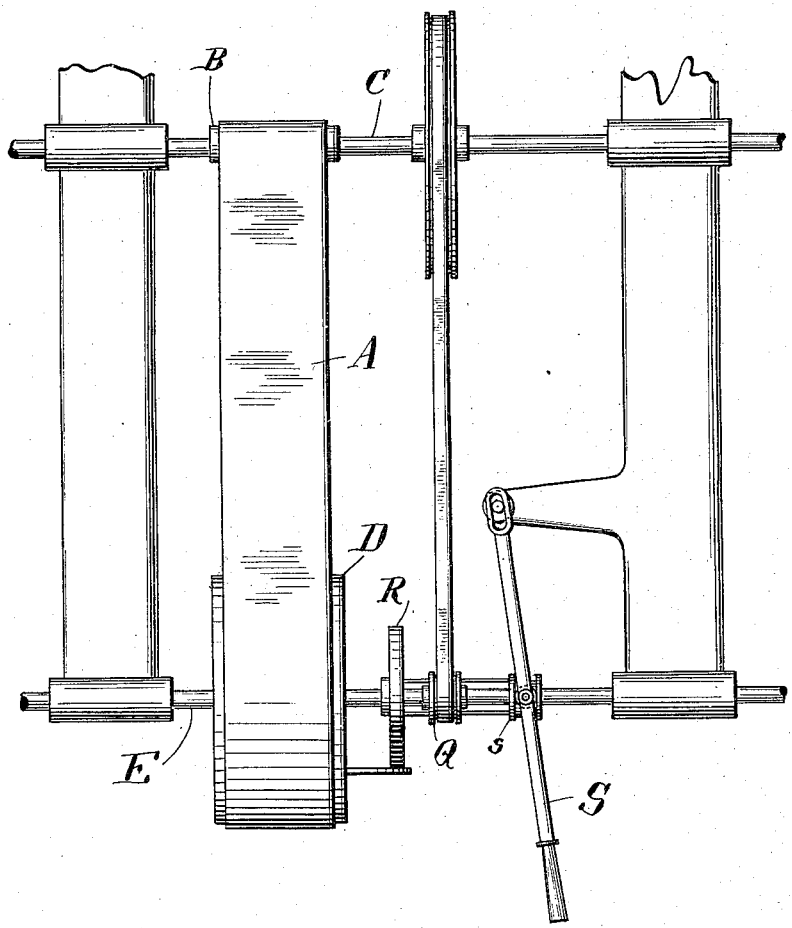

F. M. CHAPMAN.
REVERSIBLE SPEED PULLEY.
APPLICATION FILED OCT. 15, 1912.
1,156,132.
Patented Oct. 12, 1915.
2 SHEETS—SHEET 1.
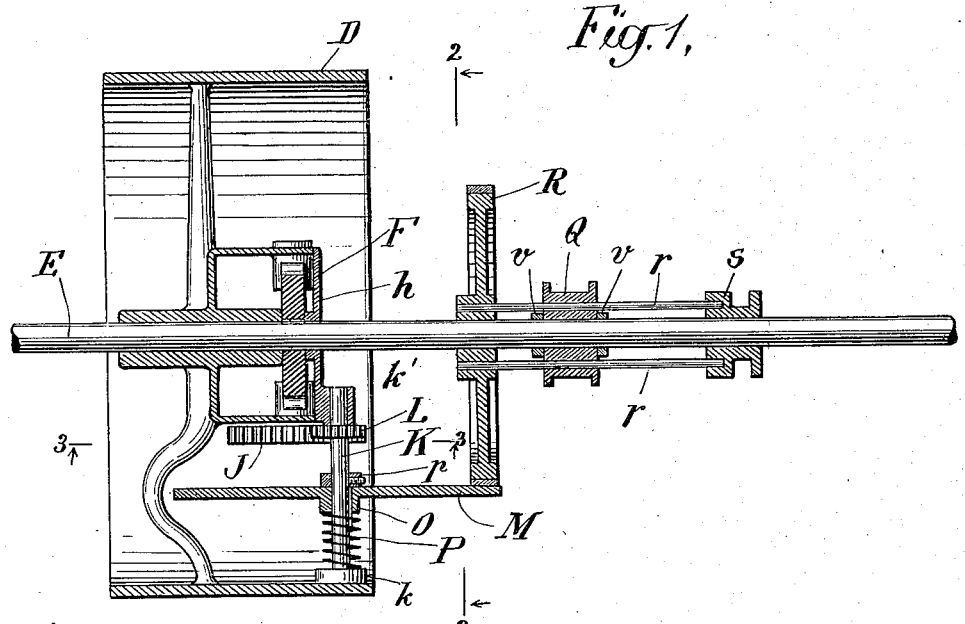
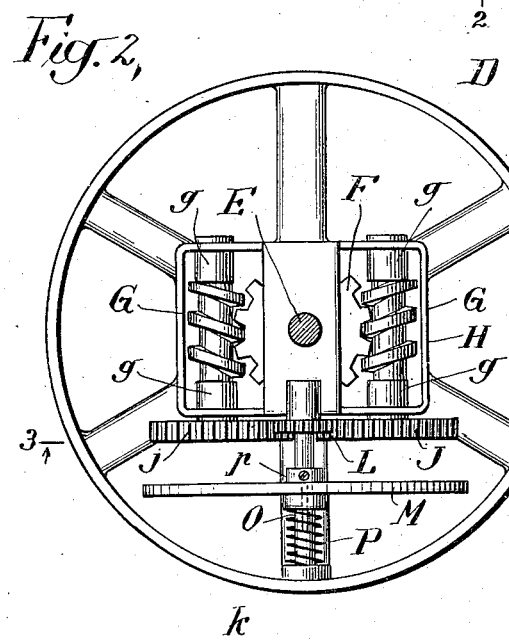
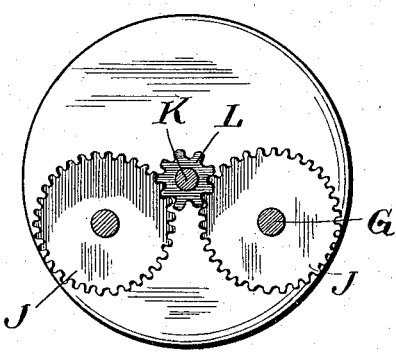
WITNESSES:
INVENTOR:
Frank M. Chapman,
BY
Hennie, Davis & Hildebraf
ATTORNEYS.
COLUMBIA PLANOGRAPH CO., WASHINGTON, D. C.

F. M. CHAPMAN.
REVERSIBLE SPEED PULLEY.
APPLICATION FILED OCT. 15, 1912.

1,156,132.

Patented Oct. 12, 1915.
2 SHEETS—SHEET 2.

WITNESSES

INVENTOR:
Frank M. Chapman,
BY
ATTORNEYS.

UNITED STATES PATENT OFFICE.

FRANK M. CHAPMAN, OF FORT EDWARD, NEW YORK, ASSIGNOR OF THREE-EIGHTHS TO FRED A. BRATT AND THREE-EIGHTHS TO ROBERT McWHORTER, OF FORT EDWARD, NEW YORK.

REVERSIBLE-SPEED PULLEY.

1,156,132.     Specification of Letters Patent.     Patented Oct. 12, 1915.

Application filed October 15, 1912. Serial No. 725,776.

*To all whom it may concern:*

Be it known that I, FRANK M. CHAPMAN, a citizen of the United States, residing at Fort Edward, county of Washington, State of New York, have invented certain new and useful Improvements in Reversible-Speed Pulleys; and I do hereby declare the following to be a full, clear, and exact description of the invention, such as will enable others skilled in the art to which it appertains to make and use the same.

The invention relates to the general class of rotary change speed devices, and is particularly directed to the attainment of a simple and efficient organization whereby the speed of a shaft may be varied from zero throughout a wide range of speeds in one or both directions.

The invention primarily consists in employing a differential gearing having one of its three essential elements positively connected with the shaft, another of said elements driven directly from the driver, and the third of said elements being driven by one of the two coöperating members of a variable friction driving mechanism, the other member of which friction driving mechanism is driven from the driver.

The invention further consists (1) in so correlating the several elements of the organization that the torque brought to bear upon the point of frictional contact of the variable friction driving mechanism is but a fraction of the torque brought to bear upon the other elements of the differential combination, which fraction may be well within the transmitting capacity of said variable friction driving mechanism; (2) in providing a worm as one element of the differential gear to be driven by the variable friction drive which will effect a locking of the differential mechanism and permit direct drive with the differential mechanism with complete disconnection of the variable friction driving mechanism; (3) in arranging the several elements of the organization in a compact self-contained unit, well adapted for ready application to machinery in general requiring variable drive; and (4) in certain details of construction and arrangement hereinafter described, and set forth in the claims appended hereto.

I have illustrated an embodiment of my invention in the accompanying drawings, in which—

Figure 1 is a longitudinal sectional view, taken in the plane of mounting of a driven shaft; Fig. 2 is a section, taken on line 2—2 of Fig. 1, showing a main driven pulley and its contained mechanism in elevation; Fig. 3 is a sectional detail, on lines 3—3 of Figs. 1 and 2; and Fig. 4 is a plan illustrating the assembly of the complete device, in connection with a driving shaft and a driven shaft.

Referring to the drawings, a main belt A is mounted upon a pulley B fast upon a driving shaft C, and a pulley D loose upon a driven shaft E. Within the inclosure of the pulley D a worm gear F is mounted fast upon the driven shaft E. Two worms G, G are mounted in bearings $g$ in a box-like structure H integral with and projecting from the spokes of the pulley D. The worms G, G are mounted upon opposite sides of and engage with the worm gear F. Attention is called at this point to the fact that if no provision were made for turning the worms G, G and power were now applied to the driving shaft, the belt A would rotate the pulley D, and, as the pitch of the worms G, G is not sufficient to cause them to turn when they engage worm gear F fast on the driven shaft E, the power would be applied to the driven shaft E as would be the case if the pulley D were fast upon the driven shaft E.

The axes of the worms G, G project beyond the bearings $g$ at one end of the box H, and upon these projecting ends spur gears J, J are mounted fast. A shaft K is mounted in a bearing $k$ in the rim of the pulley D, and in a second bearing $k'$ projecting from a cover $h$ of the box H. A pinion L mounted fast on the shaft K meshes with both of the spur-gears J, J, so that these gears and the worms G, G driven thereby must rotate in the same direction. This being the case, in order that the worms G, G may turn the worm gear F, one of these worms must have a right-hand spiral thread and the other a left-hand spiral thread. A friction face-plate M is mounted for longitudinal movement upon the shaft K, and a feather O, engaging both the shaft K and the hub of the face-plate M, transmits the rotation of the face-plate M to the shaft K, while permitting of the longitudinal movement of the face-plate M upon the shaft K.

A compression spring P surrounding the shaft K and bearing against the bearing k and the hub of the face-plate M, tends to force said plate M longitudinally upon the shaft K toward the axis of the pulley D. A collar $p$ on the shaft K limits this movement of the plate M by the spring P. A pulley Q is mounted loose upon the shaft E and is prevented from moving longitudinally thereon by collars $v$. The pulley Q is provided with a plurality of longitudinal holes through which feather rods $r$ projecting from a friction wheel R are adapted to slide.

The friction wheel R is mounted loose upon the driven shaft E and the face-plate M is held in contact with the periphery of this wheel R by the spring P. A channeled collar S is mounted loosely upon the shaft E and is secured to the feather rods $r$ serving to move the friction wheel R toward or from the axis of the face-plate M. A lever S engaging the groove in the channeled collar $s$ provides means for moving the friction wheel R toward and from the axis of the face-plate M during rotation of the device.

The friction disk M is ordinarily held in contact with the periphery of the friction wheel R by the spring P. The friction wheel R may, however, be moved axially along the shaft E until it is entirely free of the disk M. In this free position of the friction wheel R the shaft E is directly connected to the pulley D, as the worms G do not revolve and the whole of the power transmitted to the shaft E is applied through the pulley D.

When the fast run friction wheel R is brought into contact with the friction disk M near the periphery of the latter, the friction disk M is revolved at its slowest speed and turns the worms G in a direction to permit the shaft E to rotate somewhat slower than the pulley D. As the friction wheel R is moved nearer to the center of the disk M the worms are revolved at a higer rate of speed, and the shaft E runs yet more slowly until the friction wheel R reaches a point about midway of the radius of the disk M, when the worms G will be revolved at a sufficient speed to permit the shaft E to be stationary.

At all of those positions of the friction wheel R, between the periphery of the disk M and the position midway of the radius of this disk where no movement of the shaft E is attained, it will be seen that the variable friction driving mechanism has only been employed to back the worms off against the drive of the pulley D. When this midway position of the friction wheel R is passed and the point of engagement approaches the center of the disk M, the speed of the worms is increased and the shaft E is rotated in the opposite direction. As the speed of the friction wheel R is much greater than the attainable speed of the shaft E the torque exerted at the point of contact between the friction wheel R, the friction disk M never approaches the torque required to drive the shaft E direct.

It will be obvious that the pulleys D and Q may be connected by gears to run at the requisite speeds should be a belted arrangement be undesirable. It will also be obvious that the pulley Q need not be rotated when the desired range of speeds will admit of an arrangement by which the speed of the friction disk M produced by its movement about the stationary friction wheel R will attain the desired result.

What I claim is:

1. A change speed device comprising a shaft, a gear connected directly to said shaft and constituting one of the elements of a differential mechanism, a friction wheel mounted for axial movement and rotation upon said shaft and constituting a second element of said differential mechanism, a main driving member loosely mounted upon said shaft, a friction disk mounted upon said main driving member, said friction disk being engaged with the periphery of said friction wheel, and gearing connecting said friction disk to said gear, said main driving member, said friction disk and said gearing constituting the third element of said differential mechanism; substantially as described.

2. A change speed device comprising a differential mechanism, a shaft, one element of said differential mechanism being connected directly to said shaft, a second element of said differential mechanism which is rotatable upon said shaft, a friction disk carried by said second element of said differential mechanism and geared to said first element, and a third element of said differential mechanism consisting of a friction wheel axially movable upon said shaft and having its periphery engaged with said friction disk; substantially as described.

3. The combination with a shaft, of a gear fast on said shaft, a pulley loosely mounted on said shaft, a friction disk mounted for rotation within said pulley, a gear train connecting said friction disk with said gear on said shaft, said friction disk having its face lying parallel to said shaft, a second pulley mounted for rotation upon said shaft, a friction wheel mounted for longitudinal and rotary movement upon said shaft and driven from said second pulley, said friction wheel being designed for engagement with the surface of said disk, and means for moving said friction wheel axially upon said shaft; substantially as described.

In testimony whereof I affix my signature, in presence of two witnesses.

FRANK M. CHAPMAN.

Witnesses:
 FRED A. BRATT.
 C. E. BEERS.

Copies of this patent may be obtained for five cents each, by addressing the "Commissioner of Patents, Washington, D. C."